United States Patent

[11] 3,582,774

| [72] | Inventor | Robert L. Forgacs<br>Dearborn Heights, Mich. |
|------|----------|----------------------------------------------|
| [21] | Appl. No. | 807,783 |
| [22] | Filed | Mar. 13, 1969 |
| [45] | Patented | June 1, 1971 |
| [73] | Assignee | Ford Motor Company<br>Dearborn, Mich. |

[54] CIRCUIT IMPEDANCE MEASURING DEVICE EMPLOYING CLAMP ON MAGNETIC CURRRENT SENSOR
9 Claims, 11 Drawing Figs.

[52] U.S. Cl.................................................. 324/572,
324/60C, 324/62C, 324/127
[51] Int. Cl........................................................G01r 27/00,
G01r 27/26
[50] Field of Search........................................ 324/57,
117, 127, 111, 57 Z, 60 C, 62 C, 158 T, 158 D

[56] References Cited
UNITED STATES PATENTS
1,825,514 9/1931 Fitzgerald..................... 324/111

| 2,757,336 | 7/1956 | Smith-Vaniz, Jr............ | 324/57 |
| 2,783,437 | 2/1957 | Yenni et al.................... | 324/127X |
| 3,199,024 | 8/1965 | Manly et al.................... | 324/57 |

*Primary Examiner*—Rudolph V. Rolinec
*Assistant Examiner*—Ernest F. Karlsen
*Attorneys*—John R. Faulkner and Keith L. Zerschling ABSTRACT: This disclosure relates to an electrical component impedance measuring device that is capable of measuring the impedance of an electrical component permanently connected in an electrical circuit. It comprises a source of electrical energy with means coupled to this source for connecting the electrical component in circuit with the source. A split-magnetic core having an opening position therein is supported by means that position a lead from the electrical component through this opening with the lead carrying current that flows only through the electrical component whose impedance is to be measured. Means are coupled to the core for sensing and measuring the flux in this core.

INVENTOR
ROBERT L. FORGACS
BY
John R. Faulkner
Keith L. Zerschling
ATTORNEYS

INVENTOR
ROBERT L. FORGACS
BY
John R. Faulkner
Keith L. Zerschling
ATTORNEYS

CIRCUIT IMPEDANCE MEASURING DEVICE EMPLOYING CLAMP ON MAGNETIC CURRRENT SENSOR

BACKGROUND OF THE INVENTION

This invention relates to a means for measuring the values of certain electrical circuit parameters, such as resistance, capacitance and inductance. A major advantage of the in-circuit impedance measuring device of this invention over conventional techniques is that it makes possible measurement of component values, without removing the component from the circuit, despite shunting of the measured component by other circuit impedances. The shunting impedance can be two to three orders of magnitude smaller than the impedance of the component being measured without unduly impairing accuracy. This in-circuit capability can greatly simplify and speed up troubleshooting and testing procedures, since it in most cases eliminates the necessity for unsoldering or detaching components to be checked and/or the necessity for referral to a circuit schematic to determine the existence of possible shunting impedances, and calculation of their effect. An additional advantage is that the current passed through the component under test, as well as current through shunting components, including semiconductor devices, may be limited to a value which will not damage most conventional sized circuit components.

The unique advantages of the invention stem from the fact that the current through the test component is measured by sensing the magnetic field produced by the current, rather than by measuring the voltage drop across a resistor carrying the current. Thus the current through the test component can be isolated from the current delivered to any shunting component, which would otherwise cause a measurement error. If the voltage and current applied to the unknown component are both known, its impedance can be determined. In another arrangement, even the test voltage need not be known, provided only that the test voltage be simultaneously applied to a reference component, whose impedance is adjustable to the same value as the unknown component's impedance. When the current through the unknown component equals the current through the reference impedance, as evidenced by a nulling of the bucking magnetic fields produced by the two currents, the two impedances are equal.

SUMMARY OF THE INVENTION

This invention comprises an in-circuit impedance measuring device that is capable of measuring the impedance of an electrical component permanently connected in an electrical circuit. The device comprises a source of electrical energy, preferably an alternating source, and means are coupled to the source for connecting the electrical component whose impedance is to be measured in circuit with it, preferably in a series connection. A split magnetic core having an opening is provided and means support this magnetic core for positioning a lead from the electrical component through the opening that carries current through the component only. Means are coupled to the split magnetic core for sensing and measuring the flux in the core.

This device may be employed to measure the resistance of an unknown resistor, the capacitance of an unknown capacitor or the inductance of an unknown inductor. In one form of the invention an adjustable or variable comparison resistor is employed that is coupled in parallel with the unknown electrical component, and a lead from this comparison resistor is passed through the core. The unknown component or a lead therefrom is also passed through the core, and the current from this unknown component or its lead produces flux in the core in an opposite direction from the flux produced by the current in the lead from the comparison resistor. The comparison resistor is adjusted until the net flux in the core is reduced to zero. This net flux, of course, is sensed and measured by the above mentioned means and when the reading on the measuring or readout means is zero the net flux in the core is zero. The scale of the variable or adjustable comparison resistor may be calibrated to read out directly the resistance, inductance or capacitance of an electrical component having an unknown resistance, inductance or capacitance.

In other embodiments of the invention, the flux generated by the lead from the unknown electrical component may be sensed directly by the magnetic core and the amount of flux present in the core may be read directly from the flux measuring device coupled to the core. In this instance a regulated AC power supply whose instantaneous maximum value is predetermined should be used. Since the flux in the core is a direct measurement of the current through the component, the readout means may be calibrated directly in terms of the value of the unknown component used. This embodiment may be used to measure either the resistance of an unknown resistor, the capacitance of an unknown capacitor or the inductance of an unknown inductor. Although it is preferred in this embodiment of the invention to use an alternating current source, a very low frequency or even DC source may be used when resistance measurements only are to be accomplished.

An object of this invention is a provision of an accurate and reliable impedance measuring device that measures the impedance of an electrical circuit component.

A further object of the invention is a provision of an in-circuit impedance measuring device that will measure the impedance of an electrical circuit component that is permanently connected in an electrical circuit in shunt with other electrical components.

Other objects and attendant advantages of the present invention may be more readily realized when the specification is considered in connection with the attached drawings.

DESCRIPTION OF THE PREFERRED EMBODIMENT

Figure 1:
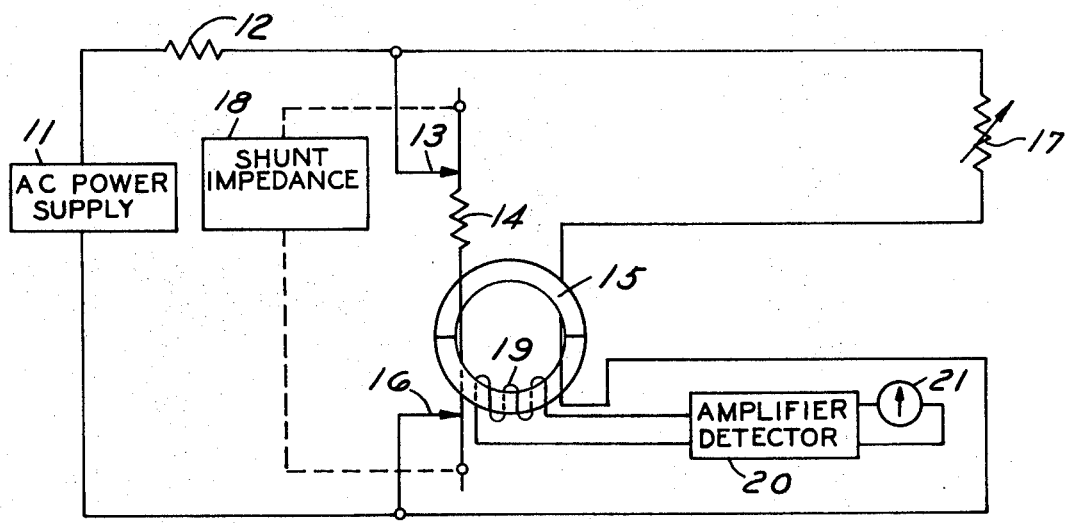
FIG. 1 is a circuit diagram of one embodiment of the invention utilized for measuring the resistance of an unknown resistor.

Referring now to the drawings in which like reference numerals designate like parts throughout various views thereof, there is shown in FIG. 1 a circuit for measuring alternating current resistance. Alternating current power supply 11 delivers an AC current limited, by limiting resistor 12, to a low enough value that it cannot damage most conventional sized components. The AC supply voltage is also limited to a safe value. Typical values may be 21 volts RMS, with a 3000 ohm limiting resistor, limiting current to 7 milliamperes RMS. The supply frequency would typically be in the low audio range. Limiting resistor 12 could equally well be an inductor, capacitor or an active device which serves the limiting function. Power supply current from one terminal of power supply 11 can divide into three possible paths after passing through limiting resistor 12. One path is via contact 13, unknown resistor 14, through magnetic core 15 and back to the other terminal of power supply 11 via contact 16. The second path is via adjustable reference resistor 17, through core 15, in the opposite direction from that traversed in the first path, and back to the other terminal of the power supply 11. The third path, is via contact 13, through unknown shunt impedance 18, and back to the other terminal of power supply 11 via contact 16, without passing through magnetic core 15. Thus when adjustable reference resistor 17 is adjusted to permit the two bucking currents to null out the magnetic field in core 15, the resistance of unknown resistor 14 equals the known adjustable reference resistor value. Null readout is accomplished by sensing any alternating field in core 15 with winding 19, amplifying and detecting this signal in amplifier detector 20 and applying the rectified voltage to meter 21 or other null readout device. The signal-to-noise ratio may be maximized by employing a tuned amplifier.

Figure 2:
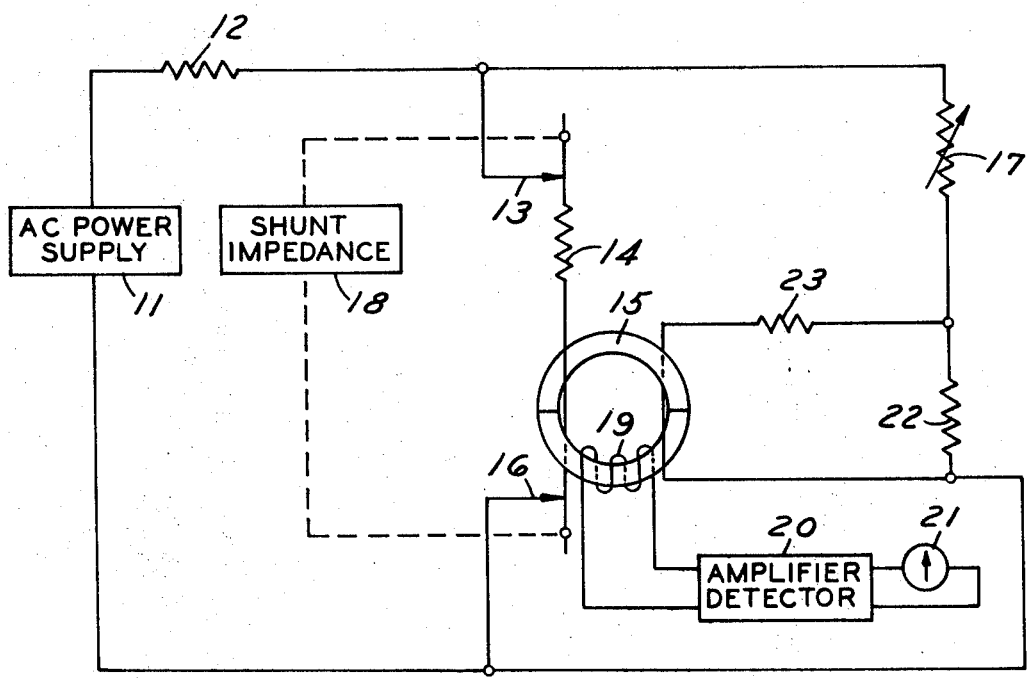
FIG. 2 is another embodiment of the present invention utilized for measuring the resistance of an unknown resistor.
Figure 3:
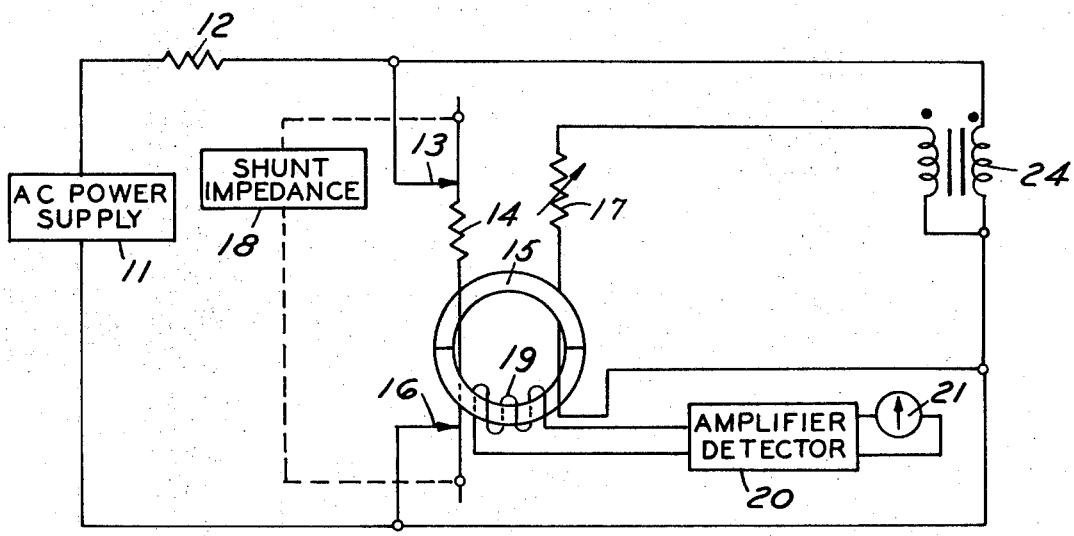
FIG. 3 is another embodiment of the present invention utilized for measuring the resistance of an unknown resistor.

To permit measurement of resistors which are higher than the maximum value of adjustable reference resistor 17, two circuits which may be employed are shown in FIG. 2 and FIG. 3. In FIG. 2, a small known fraction of the reference resistor current, equal to 1/N times reference resistor current, is passed through the core. This is accomplished by a current dividing network as shown, in which resistor 23 possesses (N—1) times the resistance of resistor 22. When a null is achieved, the unknown resistance is N times the value of the adjustable reference resistor 17. The resistance of the parallel combination of resistors 22 and 23, is made very small with respect to the minimum value of adjustable reference resistor 17 to minimize the error caused by their presence.

In FIG. 3, stepdown transformer 24 is utilized to apply 1/N times the normal voltage to reference resistor 17, thus reducing reference current by a factor N. N is the ratio of primary turns to secondary turns in transformer 24. A null will be achieved when the unknown resistance equals N times the value of adjustable reference resistor 17.

To measure the resistance smaller in the value than the minimum value of adjustable reference resistor 17, the circuit of FIG. 3 may be used, but with a voltage step-up transformer rather than a voltage stepdown transformer. If the voltage is stepped up by a factor N, a null occurs when the unknown resistor is 1/N times the value of adjustable reference resistor 17. A second means of measuring resistance smaller than the minimum reference resistor value is to employ the circuit of FIG. 1, but with the reference resistor current lead looped through the core 15 N times rather than once. A null occurs when the unknown resistance is 1/N times the value of adjustable reference resistor 17.

Figure 4:
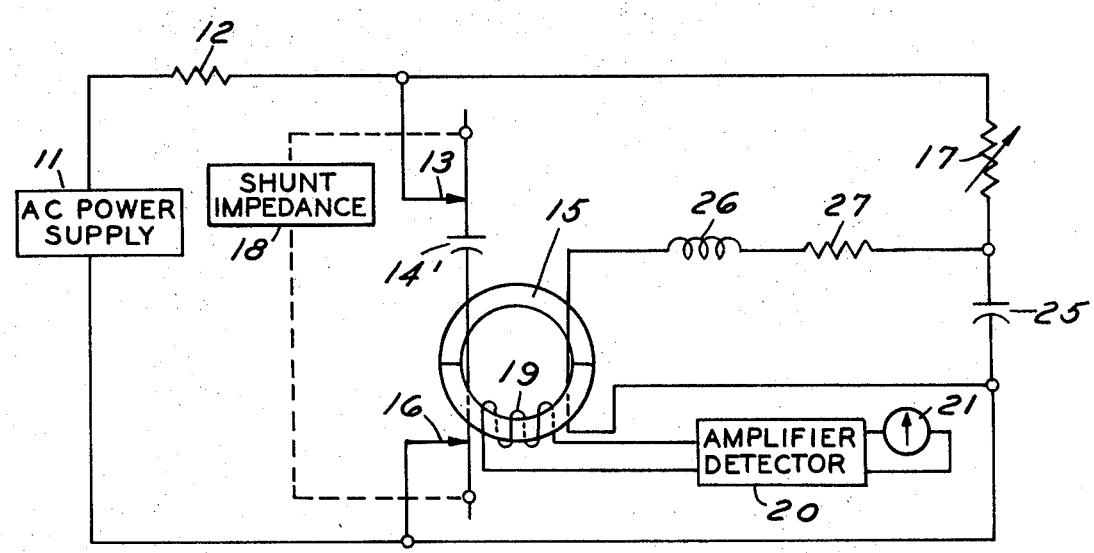
FIG. 4 is another embodiment of the invention utilized for measuring the capacitance for an unknown capacitor.

To measure the capacitance of a capacitor the circuit of FIG. 1 may be employed, with element 14 an unknown capacitance and element 17 a calibrated, adjustable, reference capacitance. This circuit has the disadvantage that available adjustable reference capacitors are of a very low value compared to the capacitors to be measured. Multiplication schemes, such as described above for resistance measurement, introduce errors for very large multiplication ratios. A preferred means of measuring capacitance that overcomes these disadvantages is shown in FIG. 4. The current through unknown capacitor 14' is compared with a current which is equal in amplitude to the current through adjustable reference resistor 17, but shifted in phase by 90°, resulting in 180° phase difference between the two compared currents. A null occurs when the resistance of adjustable reference resistor 17 equals the reactance of unknown capacitor 14', at the frequency employed. Thus the reference resistor dial may be marked directly in capacitance of the unknown. The capacitive reactance of capacitor 25, the inductive reactance of inductor 26, and the resistance of resistor 27, are all made approximately equal in magnitude at the frequency of the AC supply to yield the desired 90° phase shift with unchanged current amplitude. The impedance of the combination of elements 25, 26 and 27 is made small compared to the minimum resistance of adjustable reference resistor 17 to minimize errors.

Figure 5:
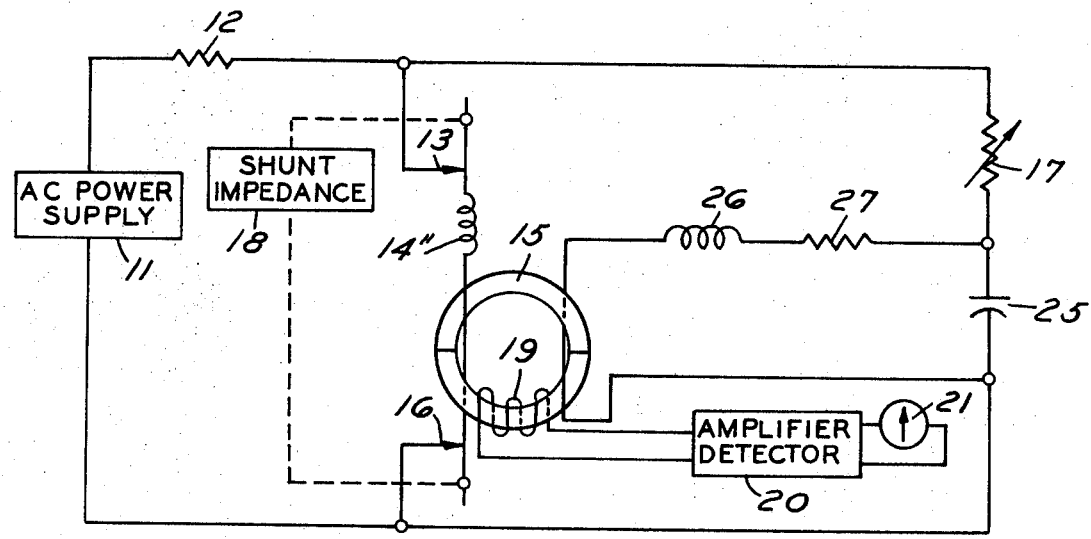
FIG. 5 is another embodiment of the invention utilized for measuring the inductance of an unknown inductor.

If the unknown component is an inductor 14" as shown in FIG. 5 it is only necessary to reverse the direction of the flux produced in the core 15 by the reference current. This may be accomplished by reversing the direction of the reference current or by passing the lead from inductor 26 through the opening in core 15 as shown in FIG. 5. A null will occur when the inductive reactance of the unknown inductor 14" equals the reference resistance in magnitude. Again, the reference resistor dial can be calibrated directly in inductance of the unknown.

Techniques similar to those described for resistance measurement and shown in FIG. 3 may be used to measure reactances which are higher or lower than the range of reference resistor values.

Figure 7:
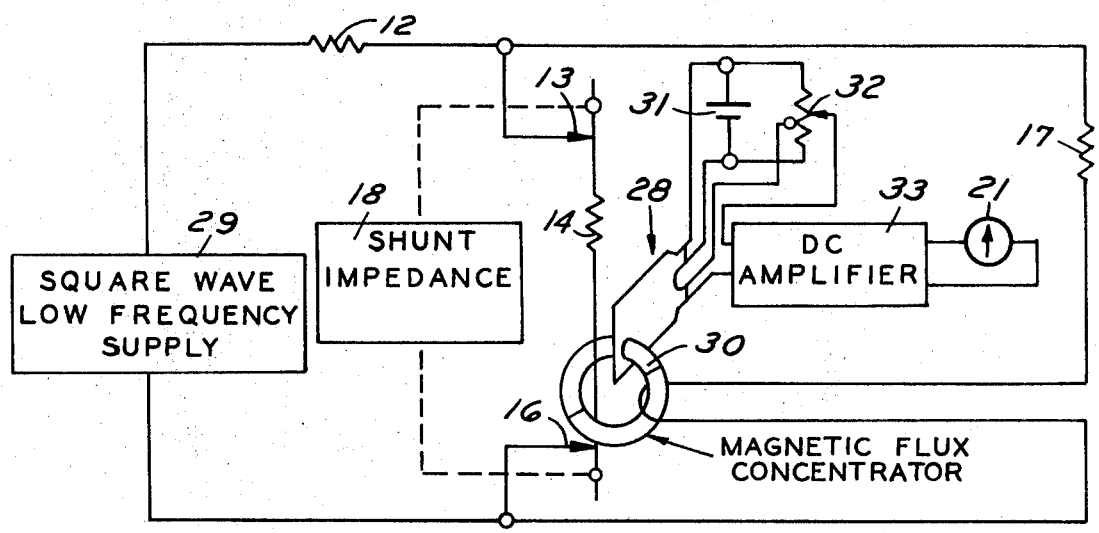
FIG. 7 is a circuit diagram of still another embodiment of the invention.

The principles of this invention can also be employed for making a DC resistance measurement device. The basic circuit is shown in FIG. 7, in which a Hall generator 28 is employed to sense a DC magnetic field. Other means for sensing DC magnetic fields could be employed equally well, for example, commercially available flux gate devices. Use of a low frequency square wave voltage source 29 permits isolation of output meter deflections, resulting from an unbalance between the unknown resistor 14 and the known adjustable reference resistor 17, from extraneous variations due to temperature, external magnetic fields, etc. Square wave low frequency supply 29 should be adjusted to a low frequency of the order of one-half cycles per second, or in the neighborhood of the resonant frequency of the output meter 21 to maximize signal-to-noise ratio. The output voltage should preferably alternate between positive and negative $E_{max}$ to maximize the output meter signal. Core hysteresis problems are minimized by the alternating positive and negative current pulsations also. Magnetic flux concentrator 30 in the form of a magnetic core similar to core 15 serves the purpose of increasing the magnetic flux density through Hall generator 28, resulting from the signal current alterations. Battery 31 and divider resistor 32 comprise a standard method for supplying input current to the Hall generator and balancing out any steady state offset to the Hall generator and balancing out any steady state offset voltage. DC amplifier 33 amplifies the Hall output signal, which is then applied to meter 21. A circuit to permit measurement of unknown resistors larger than the maximum value of adjustable reference resistor 17 similar to that shown in FIG. 3 can be employed. To measure resistors smaller than the minimum value of reference resistor 17, the circuit of FIG. 7 may be used, but with the wire carrying the reference resistor looped through flux concentrator or magnetic core 30, N times, rather than once.

All the embodiments described thus far and shown in FIGS. 1—5 and 7 for circuit component measurement utilize comparison techniques, which have the advantage of minimizing many possible errors, but have a disadvantage in making it necessary to adjust for a null before readout is obtained. It is also possible to utilize circuitry which permits direct readout of the value of the unknown component, without adjusting for a null. Direct meter readout is accomplished with the circuit of FIG. 6. The current through unknown resistor 14, unknown capacitor 14' or unknown inductor 14" is inversely proportional to the unknown resistance, the unknown capacitive reactance or the unknown inductive reactance with a constant known voltage applied across the unknown resistor, unknown capacitance or unknown inductance. The output current meter 38 therefore may be directly calibrated in terms of the unknown impedance.

The voltage applied to unknown resistor 14, unknown capacitance 14' or unknown inductance 14" is obtained from regulated AC power supply 39 through source resistance 40 which includes the internal resistance of supply 39. The peak voltage of the supply is made small enough, for example, 0.3 volts, to preclude damage to sensitive semiconductor elements which may shunt the unknown. This low voltage also limits wattage dissipated in virtually any standard sized component to a safe value. The source resistance is kept low enough, so that it will keep the output voltage reasonably constant for any load impedance down to the vicinity of the lowest expected shunt impedance or resistance to be measured. A typical value of source resistance is 0.3 ohms. Current through core 41 is monitored by winding 42. The signal from winding 42 is amplified and detected in stabilized amplifier detector 43 to drive output meter 38 which may be calibrated directly in ohms for resistance measurements. Meter 38 may also be calibrated in capacitance units for measuring the capacitance of unknown capacitors and in inductance units for measuring the inductance of unknown inductors. Although output current is a function of impedance rather than resistance or reactance, virtually all commonly used resistors normally encountered in applications for which this meter is intended, have negligible reactance at the low frequency recommended for this unit.

Figure 6:
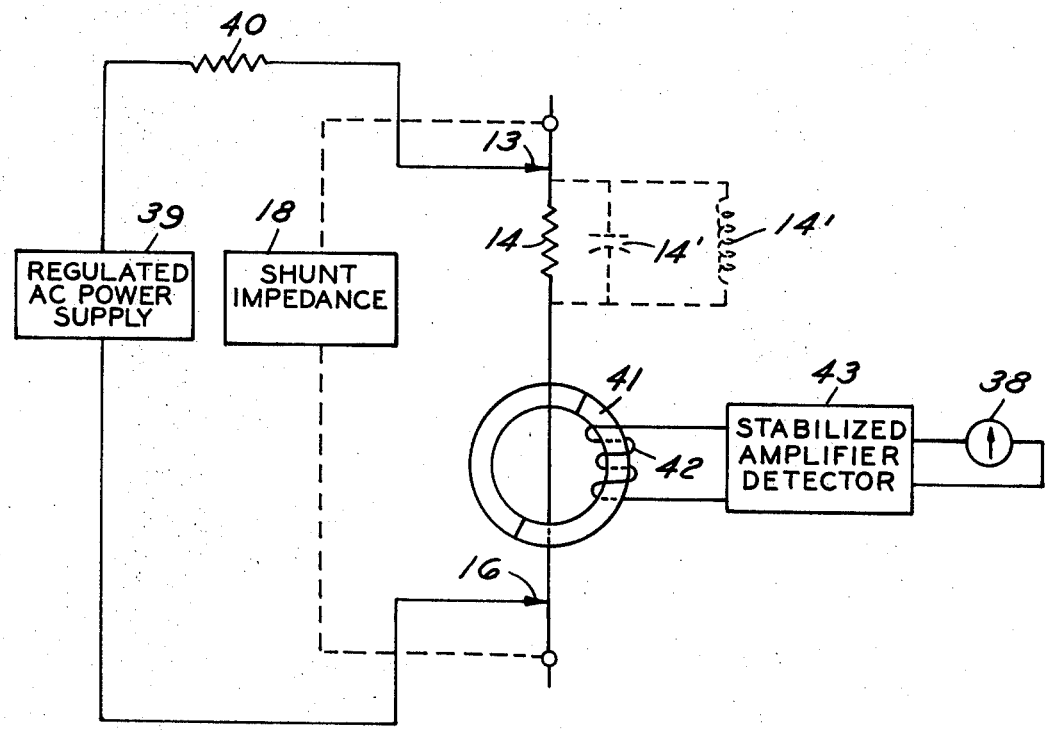
FIG. 6 is another embodiment of the invention which may read out directly the values of an unknown resistor, an unknown capacitor or an unknown inductor.

If the embodiment shown in FIG. 6 is designed solely for resistance measurement, a very low frequency or even DC power supply may be employed with appropriate change in means for current detection. This minimizes possible loading effects by large capacitances which are sometimes encountered. However, if this embodiment is employed for capacitance and possibly inductance measurements, a higher frequency power supply would be used to make the reactances expected fall within reasonable ranges. The Q of the great majority of conventional capacitors is high enough to permit reasonable accuracy in capacity measurements with this technique.

Figure 8:
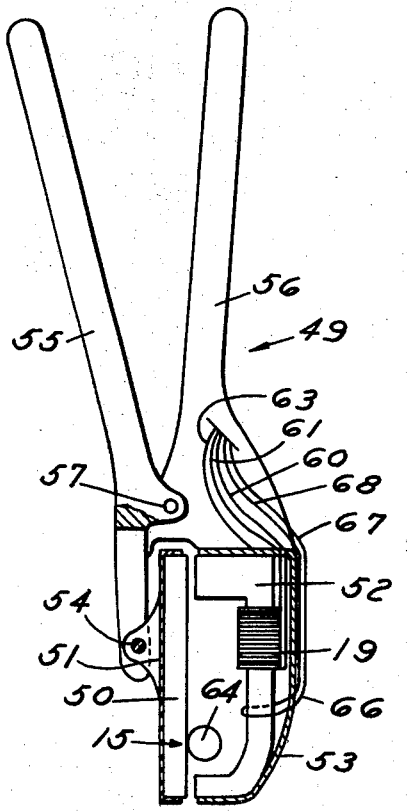
FIG. 8 is a view of a means for supporting the split ferromagnetic core of the present invention so that an electrical component or a lead therefrom passes through the core.
Figure 9:
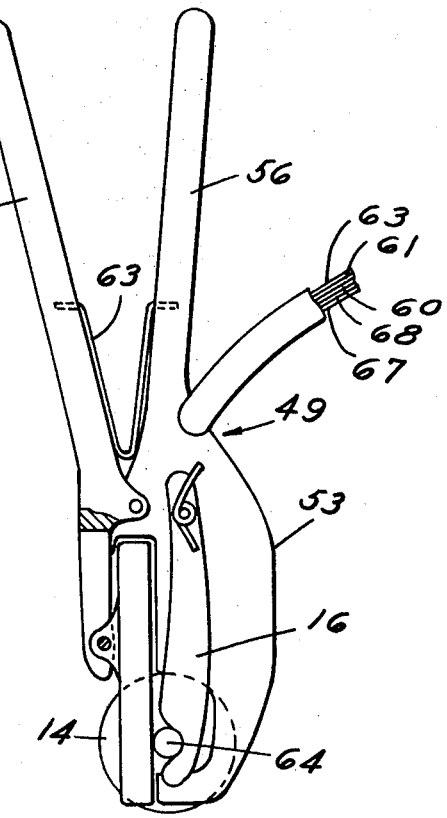
FIG. 9 is an elevational view of the structure shown in FIG. 8 and showing an electrical clip means for supplying current to the electrical component whose impedance is to be measured.

As can be seen by reference to FIGS. 1 through 6 the magnetic core 15 must encircle the component to be measured or one of its leads at a point where current threading the core is solely component current. The same is true with respect to the embodiment of the invention shown in FIG. 7, that is, the magnetic flux concentrator 30 must encircle the component to be measured or one of its leads at a point where current threading the opening is solely component current. To permit clamping over in-circuit components or their leads, the core may be split, as previously stated, and either hinged, side clamped or otherwise separated while clamping around the component or its lead. A clamping device 49 for accomplishing this purpose is shown in FIGS. 8 and 9. In these FIGS. the split magnetic core 15 is shown which may be constructed of a suitable ferromagnetic material, for example, a ferrite. One portion 50 of this core is generally flat and is carried by magnetic shielding material 51, while the other portion 52 is generally U-shaped and is carried by magnetic shielding material 53. The magnetic shielding material 51 is hingedly mounted at 54 to one of the handles 55 of the device. The other handle 56 of the device is hinged to the first handle 55 by means of hinge pin 57. The winding 19 is wrapped around the U-shaped portion 52 of the split core 15 and has leads 60 and 61 extending therefrom. These leads are connected to the amplifier detector 20 shown in FIGS. 1 through 5, to the stabilized amplifier detector 43 shown in FIG. 6 or to the Hall generator 28 and DC amplifier 33 shown in FIG. 7.

A U-shaped spring 63 may be positioned between the arms 55 and 56 to maintain the device in the position shown in FIGS. 8 and 9. The voltage contact 16 may be hingedly mounted to the magnetic shielding material 53 as shown in FIG. 9 and is in electrical contact therewith. The lead 63 shown in FIG. 8 connects the magnetic shielding material 53 and hence the voltage contact 16 to one terminal of the power supply 11 as shown in FIGS. 1 through 5, the regulated power supply 39 shown in FIG. 6 or the square wave low frequency supply 29 shown in FIG. 7. This electrical voltage contact 16 is positioned in electrical contact with a lead 64 from the unknown resistor 14 shown in FIG. 9. It is readily apparent that the unknown resistor 14 may also take the form of an unknown capacitor 14' or the unknown inductor 14''.

The loop carrying the comparison current, i.e., current through the adjustable comparison resistor 17 in the embodiments shown in FIGS. 1 through 5 and 7 is shown at 66. It threads the opening in the split core 15 and current is carried into this lead from lead 67 and flows out of the loop 66 through lead 68.

Figure 10:
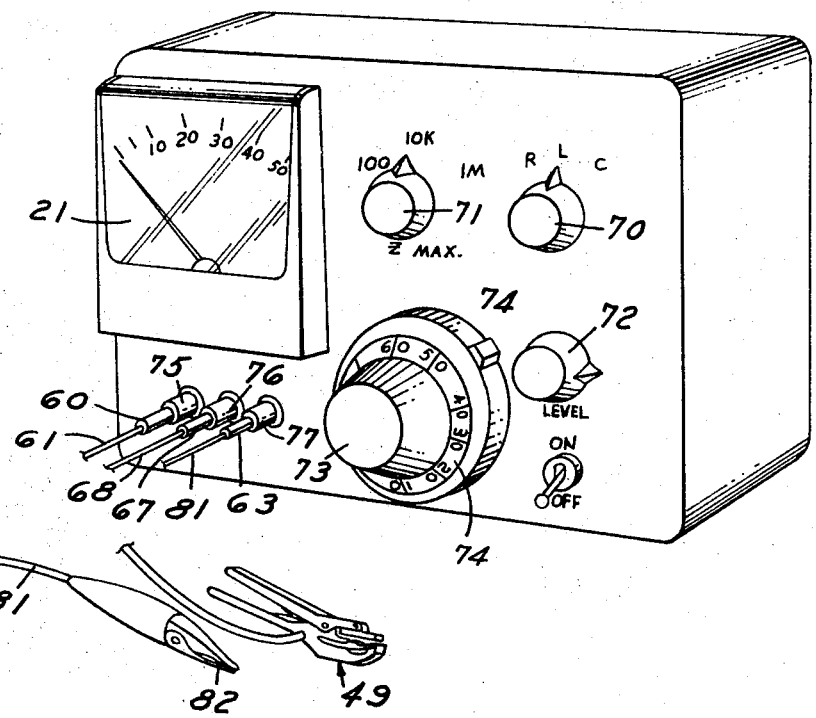
FIG. 10 is a perspective view of an electrical instrument that may include the circuits of FIGS. 1, 3, 4 and 5.

An in-circuit impedance measuring device for measuring either the resistance of an unknown resistor, the inductance of an unknown inductor or the capacitance of an unknown capacitor is shown in FIG. 10. Enclosed within the housing would be the circuits shown in FIGS. 3, 4 and 5. The switch 70 may be operated to switch in the circuits of FIGS. 3, 4 and 5 respectively to measure resistance, capacitance or inductance. Likewise the switch 71 may be set for different values of impedance i.e. 100 ohms, 10,000 ohms or a million ohms. The level control 72 may be employed to adjust the level of the alternating current output from the AC power supply 11 and the knob 73 may be turned to adjust the value of unknown resistor 17. The scale 74 is calibrated to give a direct readout of the unknown impedance when the ammeter 75 is brought to a zero reading.

The output jacks 75, 76 and 77 are employed to receive coaxial cables each having two leads. The output jack 75 may be employed to receive the leads 60 and 61 shown in FIG. 8 that are connected to the winding 19 on the split core 15, while the output jack 76 may receive a coaxial cable comprised of leads 67 and 68 which are connected to the loop 66 threaded through split ferromagnetic core 15. The output jack 77 receives a coaxial cable having one lead 63 that is connected to the shielding material 53 and the electrical contact 16. The other lead 81 is connected to a clip 82 that would be clipped on the other lead of the unknown impedance element to form the contact 13.

Figure 11:
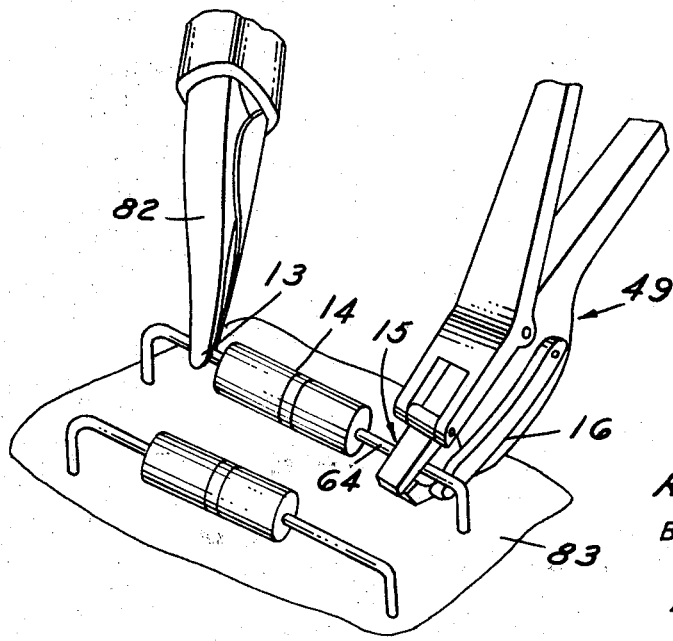
FIG. 11 is a perspective view showing the connection of the in-circuit impedance measuring device with an electrical component, the impedance of which is to be measured.

As shown in FIG. 11, the clip 82 is connected to one lead from unknown resistor 14 while the device shown in FIGS. 8 and 9 is positioned around the other lead with the contact 16 in electrical engagement with the lead and the split core 15 surrounding the lead. It can be readily realized that the clip 82 and the device or probe shown is of sufficiently small size so that they may be attached to the leads of a component which is affixed to a printed circuit board 83. It can be appreciated from an inspection of FIG. 11 that the split core 15 is positioned in board of the contact 16 so that it will sense current flowing between the contact 16 and the clip 82 that forms the contact 13 as shown in FIGS. 3 through 5. As a result, the split core 15 senses current that flows through the unknown impedance, for example resistor 14, only and does not sense current through any component that is connected in shunt with the unknown impedance.

Thus the present invention provides a very reliable, inexpensive and accurate impedance measuring device that will measure the impedance of components, i.e., resistors, capacitors, or inductors that are permanently connected in circuit with other electrical components.

I claim:

1. An in-circuit impedance measuring device for measuring the impedance of an electrical component permanently connected in an electrical circuit comprising an alternating source of electrical energy, a first circuit including a variable impedance connected in series with said source of electrical energy, a second circuit including an unknown in-circuit impedance connected in series with said alternating source of electrical energy, said first circuit connected in parallel with said second circuit, a split ferromagnetic core having a central opening therein, a lead from said first circuit passing through said opening, and means supporting said split core for positioning a lead from said second circuit and said unknown in-circuit impedance through said central opening in a direction to induce flux in said core due to current flow through said lead in an opposite direction from the flux induced in said core by current flow through the lead from said first circuit, and a detector coupled to said core for sensing the net flux therein, and means for changing the value of the variable impedance to a value where the net flux in said ferromagnetic core is zero, and readout means coupled to said last mentioned means for determining the value of said variable impedance and hence said unknown impedance.

2. The combination of claim 1 in which said variable impedance is a variable resistor.

3. The combination of claim 2 in which said unknown in-circuit impedance is a resistor of unknown value.

4. The combination of claim 2 in which said unknown in-circuit impedance is a capacitor of unknown value and in which a phase shifting means is connected in circuit with said variable resistor for shifting the phase of the current through said lead from said first circuit through substantially 90° and maintaining the amplitude of the current through said variable resistor and lead from said first circuit substantially equal, and said leads are passed through said opening such that the phase angle between the currents therein is substantially 180°.

5. The combination of claim 2 in which said unknown in-circuit impedance is an inductor of unknown value and in which a phase shifting means is connected in circuit with said variable resistor for shifting the phase of the current through said lead from said first circuit through substantially 90° and maintaining the amplitude of the current through said variable resistor and said lead from said first circuit substantially equal, and said leads are passed through said opening such that the phase angle between the currents therein is substantially 180°.

6. An in-circuit impedance measuring device for measuring the impedance of an electrical component permanently connected in an electrical circuit comprising a source of electrical energy, a first circuit including a resistor connected in series with said source of electrical energy, a second circuit including an unknown in-circuit resistor connected in series with said source of electrical energy, said first circuit connected in parallel with said second circuit, a split ferromagnetic core having a central opening therein, a lead from said first circuit passing through said opening, and means supporting said split core for positioning a lead from said second circuit and said unknown in-circuit resistor through said central opening in a direction to induce flux in said core due to current flow through said lead in an opposite direction from the flux induced in said core by current flow through the lead from said first circuit, and a Hall generator coupled to said core for sensing the net flux therein, and readout means coupled to said Hall generator for determining the value of said unknown in-circuit resistor.

7. An in-circuit impedance measuring device for measuring the impedance of an electrical component, which comprises: an alternating source of electrical energy; a split ferromagnetic core having a central opening therein, said split core being adaptable for positioning around said electrical component or a lead thereof, an electrical current in said electrical component producing a magnetic flux in said ferromagnetic core; detector means coupled to said core for indicating the existence of a net flux therein; an adjustable impedance connected between the terminals of said source, said adjustable impedance being electrically connected to a lead wire passing through said central opening in said split ferromagnetic core, a current from said source of electrical energy through said lead wire producing a magnetic flux in opposition to the flux produced by said current in said electrical component; and means for connecting said electrical component to be measured in electrical circuit with said source of electrical energy.

8. An in-circuit impedance measuring device in accordance with claim 7, in which said adjustable impedance is an adjustable resistor, in which said electrical component to be measured is a capacitor of unknown value, and in which a phase shifting means is connected in circuit with said variable resistor for shifting the phase of the current through said lead wire through substantially 90° with respect to the current in said adjustable resistor, thereby, to enable said electrical component or a lead thereof to be positioned so that the magnetic flux produced by a current therein is substantially 180° out of phase with the magnetic flux produced by the current in said lead wire.

9. An in-circuit impedance measuring device in accordance with claim 7, in which said adjustable impedance is an adjustable resistor, in which said electrical component to be measured is an inductor of unknown value, and in which a phase shifting means is connected in circuit with said adjustable resistor for shifting the phase of the current through said lead wire through substantially 90° with respect to the current in said adjustable resistor, thereby, to enable said electrical component to be positioned in said split ferromagnetic core so that the magnetic flux in said core produced by the current in said electrical component is substantially 180° out of phase with the magnetic flux in said core produced by the current in said lead wire.